US010025865B2

(12) United States Patent
Pearson et al.

(10) Patent No.: US 10,025,865 B2
(45) Date of Patent: *Jul. 17, 2018

(54) ROBUST FILTERS FOR SOCIAL NETWORKING ENVIRONMENTS

(71) Applicant: Gregory A. Pearson, Inc., Dunedin, FL (US)

(72) Inventors: Gregory A. Pearson, Dunedin, FL (US); David B. Hall, New Port Richey, FL (US); Joseph J. Cahill, St. Petersburg, FL (US); Nicholas N. Panone, St. Petersburg, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 569 days.

This patent is subject to a terminal disclaimer.

(21) Appl. No.: 14/792,883

(22) Filed: Jul. 7, 2015

(65) Prior Publication Data

US 2015/0310117 A1    Oct. 29, 2015

Related U.S. Application Data

(63) Continuation of application No. 14/331,204, filed on Jul. 14, 2014, now Pat. No. 9,100,340, which is a
(Continued)

(51) Int. Cl.
*G06F 15/16* (2006.01)
*G06F 17/30* (2006.01)
(Continued)

(52) U.S. Cl.
CPC ...... *G06F 17/30867* (2013.01); *G06F 3/0482* (2013.01); *G06F 3/04842* (2013.01);
(Continued)

(58) Field of Classification Search
CPC .. G06Q 10/107; G06Q 30/02; G06Q 21/6218; H04L 12/14; H04L 12/1403; H04L 47/42
(Continued)

(56) References Cited

U.S. PATENT DOCUMENTS

2007/0127383 A1* 6/2007 Borella ............... H04L 12/14
370/241
2009/0070435 A1* 3/2009 Abhyanker ........... G06Q 30/02
709/218
(Continued)

*Primary Examiner* — Kyung H Shin
(74) *Attorney, Agent, or Firm* — Troutman Sanders LLP; James E. Schutz; Christopher C. Close, Jr.

(57) ABSTRACT

Networking systems and methods according to exemplary embodiments of the present invention can provide robust filtering to enable users to customize their networking environments. A networking system can comprise a plurality of interfaces, a request unit, a management unit, and a filter unit. Each interface can include a plurality of displayable objects, each of which can represent some user of the networking system. The request unit can receive from a client a request for one of the interfaces. The management unit can manage filters, where each active filter hides one or more users from one or more other users. When an interface is requested by a client associated with a first user, the filter unit can apply the active filters to the requested interface to exclude displayable objects that represent users hidden from the first user by one or more active filters.

18 Claims, 6 Drawing Sheets

Related U.S. Application Data continuation of application No. 13/163,003, filed on Jun. 17, 2011, now Pat. No. 8,782,125.

(51) Int. Cl.
| | |
|---|---|
| *G06Q 10/10* | (2012.01) |
| *G06Q 30/02* | (2012.01) |
| *H04L 12/14* | (2006.01) |
| *H04L 29/06* | (2006.01) |
| *H04L 12/24* | (2006.01) |
| *G06F 3/0482* | (2013.01) |
| *G06F 3/0484* | (2013.01) |
| *H04L 29/08* | (2006.01) |
| *G06F 21/62* | (2013.01) |
| *H04L 12/26* | (2006.01) |

(52) U.S. Cl.
CPC ........... *G06Q 10/10* (2013.01); *G06Q 10/107* (2013.01); *G06Q 30/02* (2013.01); *H04L 12/1403* (2013.01); *H04L 41/50* (2013.01); *H04L 65/403* (2013.01); *H04L 67/02* (2013.01); *H04L 67/42* (2013.01); *G06F 21/6218* (2013.01); *G06F 2221/2105* (2013.01); *G06F 2221/2113* (2013.01); *H04L 12/14* (2013.01); *H04L 43/00* (2013.01)

(58) Field of Classification Search
USPC .......................................................... 709/203
See application file for complete search history.

(56) References Cited

U.S. PATENT DOCUMENTS

2011/0145905 A1* 6/2011 Cho .................... G06F 21/6218
726/7
2011/0295934 A1* 12/2011 McCormack ........ G06Q 10/107
709/203

\* cited by examiner

ROBUST FILTERS FOR SOCIAL NETWORKING ENVIRONMENTS

CROSS-REFERENCE TO RELATED APPLICATIONS

This application is a continuation of and claims the benefit of U.S. patent application Ser. No. 14/331,204, filed 14 Jul. 2014, which is a Continuation of U.S. patent application Ser. No. 13/163,003, now U.S. Pat. No. 8,782,125, filed 17 Jun. 2011, the entire contents and substance of which are incorporated by reference as if fully set forth below.

TECHNICAL FIELD

Various embodiments of the invention relate to virtual networking and, more particularly, to robust filtering in virtual networking environments.

BACKGROUND

Social networking environments generally provide search utilities that enable a user to search for other users by providing search criteria, thus filtering out those users that do not meet the provided search criteria. These search utilities are useful in that they enable users to identify friends, family, or other users meeting specific characteristics. After a user leaves the search page, however, users not meeting the search criteria are shown to the first user as part of the general networking environment.

Social networking environments also enable a user to block specific other users, so that the blocked users cannot interact with the user who did the blocking. A block must be applied individually to each user, so that blocking multiple people can become a chore.

SUMMARY

There is a need for robust filtering systems for virtual networking systems or environments, whereby a first user can not only search through other users, but can also interact with the networking system as if only a subset of the other users exists on the networking system. It is to such a networking system and environment, and associated methods, that various embodiments of the present invention are directed.

Briefly described, a networking system according to embodiments of the present invention can comprise a plurality of interfaces, a request unit, a management unit, and a filter unit.

The interfaces of the networking system may be web pages or software application interfaces through which a user can interact with the networking system. Each interface can correspond to a plurality of displayable objects, and each displayable object can represent one or more users of the networking system. Displayable objects can be various items that can be displayed in an interface. A displayable object can be a trace of at least one user, and can therefore represent that at least one user. For example, and not limitation, a displayable object can be a comment, a photo, a tag, or another aspect of an interface that can refer to or otherwise represent one or more specific users.

The request unit can receive requests from clients for the various interfaces of the networking system. After a request is received, the requested interface can be filtered and then transmitted to the requesting client.

The management unit can receive and manage filters from users of the networking system. A filter from a first user can indicate one or both of the following: (1) which subset of the users of the networking system may view the first user; and (2) which subset of the users of the networking system may be viewable to the first user. When active, a filter can hide one or more users from one or more other users.

The filter unit can provide the interfaces to clients of the networking system, with application of the filters that are currently active on the networking system. Each interface can comprise a plurality of data. For example, if an interface is a web page then that interface can comprise code, such as HTML code or scripting code, used by the client to display the interface. When a client requests a particular interface, the filter unit can select and transmit the data corresponding to the requested interface to the client. When selecting the data for transmission, the filter unit can access active filters. Applying the active filters, the filter unit can filter the data corresponding to the requested interface before transmitting that data to the client. Accordingly, the client can receive a filtered version of the requested interface. In an exemplary embodiment, the filtered interface can exclude displayable objects representing some or all users who are hidden from the user at the client by active filters.

Accordingly, the networking system can enable each user to view and interact with only a subset of the other users, so as to customize each user's experience with the networking system. These and other objects, features, and advantages of the networking system will become more apparent upon reading the following specification in conjunction with the accompanying drawing figures.

DETAILED DESCRIPTION

To facilitate an understanding of the principles and features of the invention, various illustrative embodiments are explained below. In particular, the invention is described in the context of being a web-based interactive networking system and environment for social networking incorporating a robust filtering system. Embodiments of the invention, however, are not limited to web-based implementations, or to social networking. Rather, embodiments of the invention can be used for networking and interaction between various entities and individuals in various environments. Some exemplary embodiments of the networking system can be used for personal entertainment, and others can be for professional use. Professional uses of the networking system can include, for example, personnel recruiting, educational applications, and various other applications in which filtering users according to customized criteria can be useful. Embodiments of the present networking system can be implemented in media centers, video game consoles, operating systems, and virtual machines. Media centers can include television, telephone, and internet technologies, any of which can utilize various embodiments of the present networking system. Operating systems, such as Linux™, Mac OS X™, and Microsoft Windows™, enable certain technologies to be implemented within the operating system outside of the framework of the World Wide Web. Accordingly, embodiments of the networking system can be utilized in such operating systems without use of the World Wide Web. In addition, technologies such as Java™ and Adobe Air™ allow functionality outside the scope of the World Wide Web, in the context of "virtual machines," which can utilize the present networking system. Throughout the present description, the present invention is described as embodied in a web environment. However, those of skill in the art will recognize that the concepts of the invention are not limited to a web environment and could be applied to various other systems. Accordingly, reference to web components herein is for convenience, and such references should not be considered limiting. For example, and not limitation, references to a web browser or web client may refer to some other software application having access to a network.

The components described hereinafter as making up various elements of the invention are intended to be illustrative and not restrictive. Many suitable components that would perform the same or similar functions as components described herein are intended to be embraced within the scope of the invention. Such other components not described herein can include, but are not limited to, for example, components developed after development of the invention.

Various embodiments of the present invention comprise networking systems incorporating robust filters and a robust filtering system. Referring now to the figures, in which like reference numerals represent like parts throughout the views, various embodiments of the networking system will be described in detail.

Figure 1:
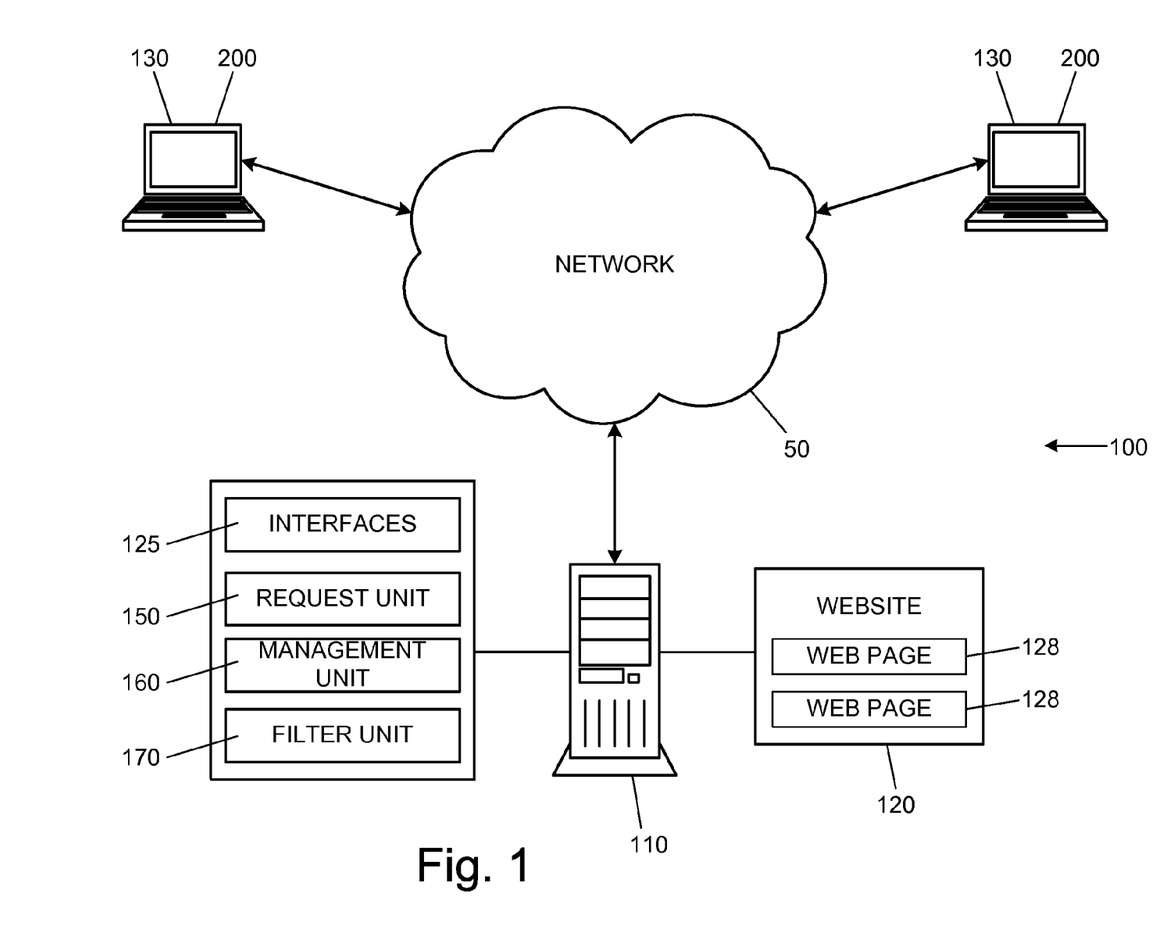
FIG. 1 illustrates a diagram of a networking system incorporating a robust filtering system, according to an exemplary embodiment of the present invention.

FIG. 1 illustrates a diagram of a networking system 100 incorporating a robust filtering system, according to an exemplary embodiment of the present invention. As shown in the FIG. 1, the networking system 100 can comprise a server 110, a website 120, and one or more clients 130. The server 110 can be or can access a web server for managing the website 120. The server and each client 130 can be one or more computing devices 200 (see FIG. 2), a portion of a computing device 200, or a set of one or more processes. For example, and not limitation, a client 130 can be a personal computer or a web client. Each client 130 can be associated with a user, and the associated user can use the client 130 to communicate with the server 110. Communications between each client 130 and the server 110 can occur over a network 50, such as the Internet.

Figure 2:
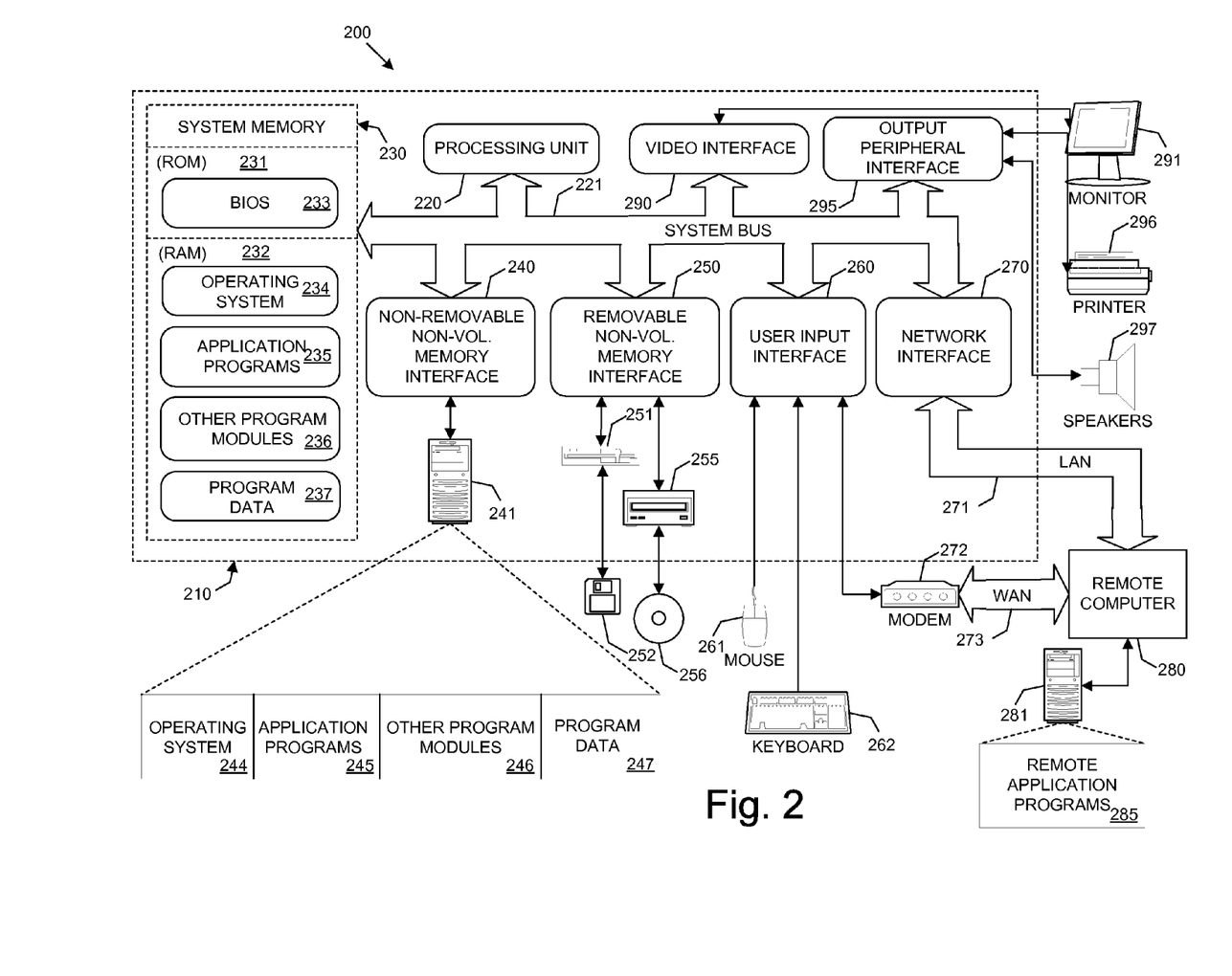
FIG. 2 illustrates an example of a suitable computing device that can be used in the networking system, according to an exemplary embodiment of the present invention.

Each of the server 110 and the clients 130 can be one or more computing devices 200 or portions thereof. FIG. 2 illustrates an example of a suitable computing device 200 that can be used as or can comprise a portion of a client 130 or the server 110, in an exemplary embodiment of the networking system 100. Although specific components of a computing device 200 are illustrated in FIG. 2, the depiction of these components in lieu of others does not limit the scope of the invention. Rather, various types of computing devices 200 can be used to implement embodiments of the networking system 100. Exemplary embodiments of the networking system 100 can be operational with numerous other general purpose or special purpose computing system environments or configurations. Examples of well known computing systems, environments, and/or configurations that can be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary embodiments of the networking system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types. Embodiments of the networking system 100 can also be practiced in distributed computing environments, where tasks are performed by remote processing devices that are linked through a communications network. In a distributed computing environment, the server 110 can comprise multiple computing devices 200, and processes that would otherwise be performed by the server 110 can be executed by clients 130 or other devices located remotely from one another.

With reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable/non-removable, volatile/nonvolatile computer storage media. By way of example only, FIG. 2 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2 can provide storage of computer readable instructions, data structures, program modules and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client 235 can request and render web pages, such as those written in Hypertext Markup Language ("HTML"), in another markup language, or in a scripting language. The web client 235 can be capable of executing client-side objects, as well as scripts within the browser environment. Additionally, the web client 235 can execute web application programs, which can be embodied in web pages.

A user of the computing device 200 can enter commands and information into the computing device 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computing device 200 can also include other peripheral output devices such as speakers 297 and a printer 296. These can be connected through an output peripheral interface 295.

The computing device 200 can operate in a networked environment, being in communication with one or more remote computers 280 over a network 50. The remote computer 280 can be a personal computer, a server, a router, a network PC, a peer device, or other common network node, and can include many or all of the elements described above relative to the computing device 200, including a memory storage device 281. For example, and not limitation, if the computing device 200 is a client 130, them the remote computer 280 can be the server 110. Analogously, if the computing device 200 is the server 110, then the remote computer 280 can be a client 130. The network 50 can comprise the Internet, a local area network (LAN) 271, a wide area network (WAN) 273, or one or more other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory storage device 281. It will be appreciated that the network connections shown are exemplary and other means of establishing a communications link between the computers can be used.

Referring back to FIG. 1, the networking system 100 can provide a robust filtering system whereby users of the networking system 100 can selectively view only aspects of the networking system 100 that meet specified criteria. On conventional networking websites, a user can search the website for users meeting specific criteria, but after leaving the search page, the user can then see aspects of the networking system 100 related to various users, including those that were filtered out on the search page. In contrast, embodiments of the present networking system 100 can enable a user to filter the entire networking system 100, so that one, some, or all interfaces 125 of the networking system 100 are filtered. Accordingly, to a particular user, the networking system 100 can appear to consist only of those users who meet certain criteria. For example, if a current user wishes to interact only with redheads who have college degrees, then the networking system 100 can appear to be made up of only redheads with college degrees. Accordingly, the networking system 100 can remove distractions, i.e., other users who do not fit specified criteria, to the current user's purpose on the networking system 100.

The networking system 100, on or accessible by the server 110, can comprise one or more units for processing data and providing data to the clients 130. The units of the networking system 100 can be programs, program modules, or other operative components of the networking system 100. These units can comprise, for example, a request unit 150, a management unit 160 and a filter unit 170. Generally, the request unit 150 can receive requests from the clients for interfaces 125 of the networking system 100; the management unit 160 can receive and manage filters applicable to the networking system 100; and the filter unit 170 can filter the interfaces 125 according to the filters, so that filtered versions of the interfaces 125 can be provided to the clients 130 in response to requests received from the clients 130. Although these units are described herein as being distinct components of the networking system 100, this need not be the case. The units are distinguished herein based on operative distinctiveness, but they can be implemented in various fashions. The elements or components making up the various units can overlap or be divided in a manner other than that described below.

In an exemplary embodiment, the networking system 100 can comprise a plurality of interfaces 125, which can be application interfaces or web pages 128 of the associated website 120. A client 130 associated with a user can interact with the server 110 and with one or more other clients 130 connected to the server 110 by requesting and using one or more of the interfaces 125 of the networking system 100. For example, when the networking system 100 utilizes a website 120 for interactions, the client 130 can request web pages 128, which can be displayed to the user at the client 130. Through interactions with the web pages 128, or other interfaces 125, the user can utilize the networking system 100.

Each interface 125 can comprise or correspond to a plurality of data. For example, and not limitation, each web page 128 can correspond to code in a mark-up language, a scripting language, or a combination of both. When a client 130 requests a particular interface 125, the data corresponding to the requested interface 125 can be transmitted to the client 130. For example, if a requested interface 125 is a web page 128, then code for rendering the web page 128 can be transmitted to the client 130.

Figure 3:
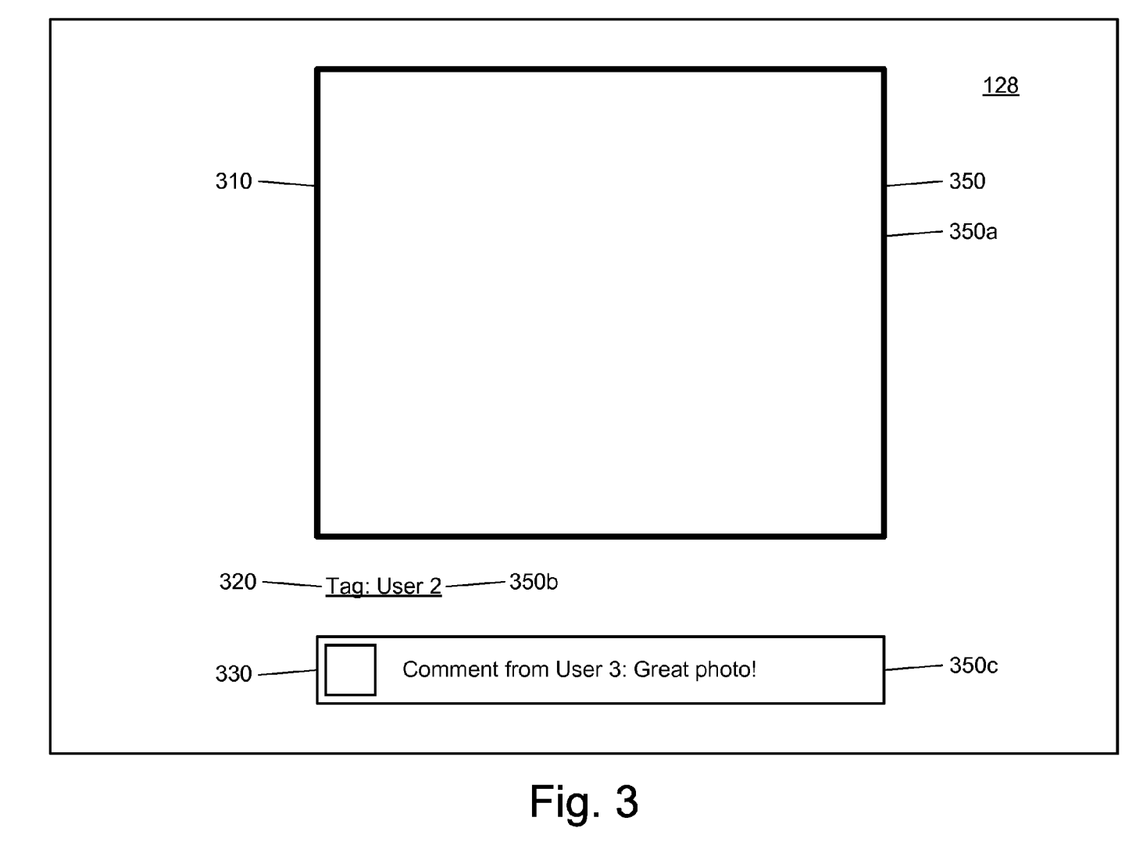
FIG. 3 illustrates an exemplary interface of the networking system, according to an exemplary embodiment of the present invention.

Each interface 125 can correspond to a plurality of displayable objects 350. A displayable object 350 can be a graphical object, text object, or other item displayable on an interface 125 of the networking system 100. A displayable object 350 can represent one or more specific users, and can include a trace or identification of the represented users. For example, and not limitation, a displayable object 350 can be a comment 330, a photo 310, a tag 320, or another aspect of an interface 125 that can refer to or otherwise represent one or more specific users.

FIG. 3 illustrates an exemplary interface 125 of the networking system 100, according to an exemplary embodiment of the present invention. For example, as shown in FIG. 3, an interface 125 can include a photo 310 posted by a first user. The photo 310 can be a first displayable object 350a that represents, or corresponds to, the first user. A second user may be tagged in the photo 310, thus causing the interface 125 to include a second displayable object 350b representing the second user, where the second displayable object 350b is a tag 320. A third user may post a comment 330 about the photo 310 on the interface 125, thus causing the interface 125 to also include a third displayable object 350c representing the third user, where the third displayable object 350c is a comment 330. Accordingly, the interface 125 can include and correspond to displayable objects 350 representing the first user, the second user, and the third user.

The networking system 100 can enable users to experience a customized networking environment, by filtering undesired displayable objects 350 from interfaces 125 delivered to each user. Each user can be logged into his or her associated client 130, so that the networking system 100 can be aware of which user is associated with each client 130. The networking system 100 can thus customize the interfaces 125 rendered on each client 130, so as to apply the filters applicable to the associated user.

Each filter, when active, can hide one or more users from one or more other users across the networking system 100 and across some or all interfaces 125 of the networking system 100. When a second user is hidden from a first user by application of a filter, the interfaces 125 transmitted to the first user's client 130 can exclude displayable objects 350 representing the second user. In some embodiments, this filtering can be applied on a select set of the interfaces 125, so that hidden users can be visible in some instances. In some other embodiments of the networking system 100, however, the filtering can occur for every interface 125 of the networking system 100. As a result, a filter can dynamically hide some or all traces of hidden users from a user of the networking system 100. This can enable a current user to customize his experience with the networking system 100, so as to remove traces of other users that the current user does not wish to see and, in some embodiments, to remove traces of the current user from other users by whom the current user does not wish to be seen.

Figure 4:
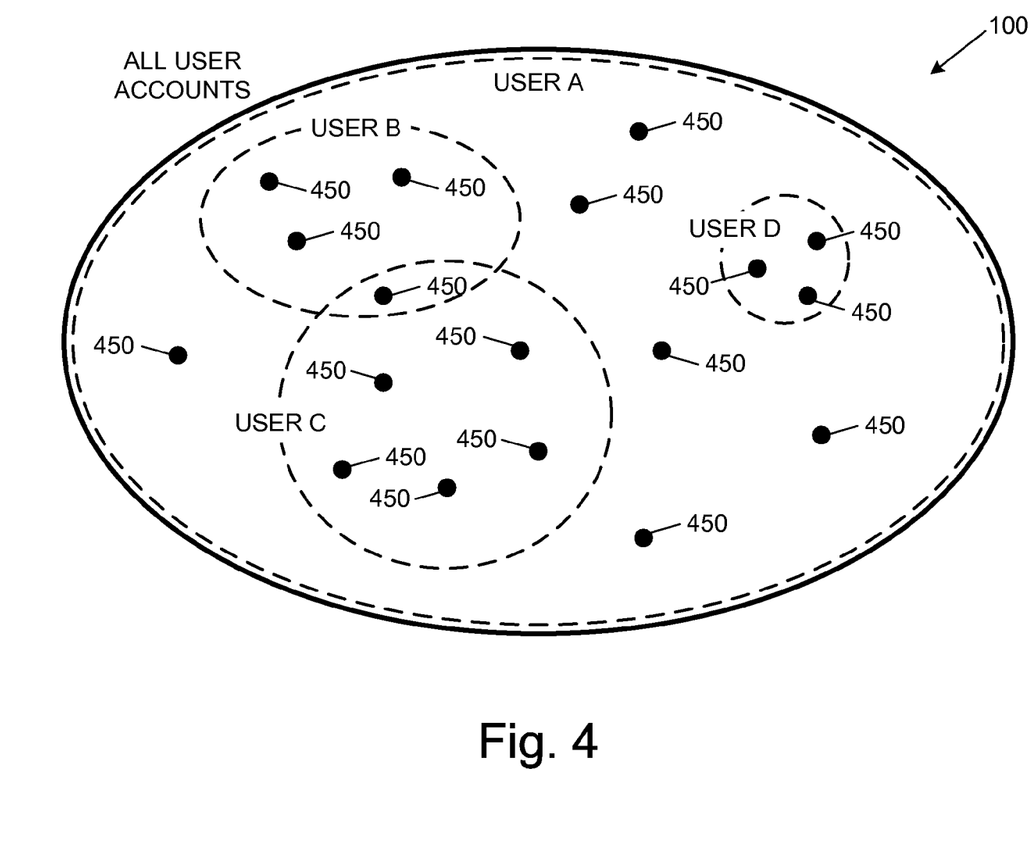
FIG. 4 illustrates a diagram of the networking system with application of one or more filters, according to an exemplary embodiment of the present invention.

FIG. 4 illustrates a diagram of the networking system 100 with application of one or more filters, according to an exemplary embodiment of the present invention. In FIG. 4, the perspectives of four users are shown, where the solid boundary denotes the full set of users of the networking system, and where each dashed line represents the various views of Users A-D, as labeled. The networking system 100 can comprise a plurality of user accounts 450, each user account 450 being associated with a user of the networking system 100. In the example of FIG. 4, no filters apply to User A, who sees a complete view of all users of the networking system 100. With no applicable active filters, a user's view of the networking system 100 can thus be the complete set of user accounts of the networking system 100. As shown with respect to Users B-D, filters of the networking system 100 can apply to a user to hide others from that user. Because different filters can apply to each user, users can have different views of the networking system 100. For example, each of Users B-D can see only a subset of the other users, so that the networking system appears to each of these users as only including a respective subset of all users of the networking system 100. Depending on the specific filters that are active and applicable, as shown, various users' views of the networking system may overlap but need not do so.

When applied, a filter can hide a second user from a first user, such that the first user may be unable to view, see, access, or interact with some or all aspects of the second user or the second user account 450 on the networking system 100. When a second user is hidden from a first user, the networking system 100 can hide, i.e., not display, some or all traces of the second user from the networking system 100, such as from the website 120 of the networking system 100. These traces of the second user that are removed may include displayable objects 350 on the interfaces 125 of the networking system 100, for example, a profile page associated with the user, activities conducted by the second user, and various other objects associated with, related to, or referencing the second user. Accordingly, if a web page 128 is displayed to the first user that would otherwise include a photo 310, other image, tag 320, comment 330, or other representation of the second user, such traces of the second user can be left out of the web page 128 when that page is transmitted to or rendered on the first user's client 130.

The networking system 100 can support one or more of internal filters, external filters, and two-way filters. Each filter can hide one or more users from one or more other users of the networking system 100. An internal filter of a first user can limit the view of the first user, thereby enabling the first user to see only a selected subset of other users of the networking system 100. When applied, an internal filter thus hides one or more other users from the first user. An external filter of a first user can limit the view of other users with respect to the first user, thereby enabling only a selected subset of other users to see the first user on the networking system 100. When applied, an external filter thus hides the first user from one or more other users. A two-way filter can be both an internal filter and an external filter. When applied by the first user, a two-way filter can thus hide a selected subset of other users from the first user, while simultaneously hiding the first user from the selected subset of other users. An exemplary embodiment of the networking system 100 can support one, two, or all of these different filter types. For example, and not limitation, an exemplary embodiment of the networking filter can allow only internal filters, so that a first user may not be allowed to limit the view of other users, but can opt to hide some users from his or her own view.

The networking system 100 can receive one or more filters from each of one or more users of the networking system 100. For example, and not limitation, the networking system 100 can provide a web page 128, or other interface 125, through which a user can specify one or more sets of filtering criteria, where each set of criteria corresponds to a filter. In an exemplary embodiment, each filter may be an internal filter, an external filter, or a two-way filter. Each filter can specify a set of whitelist criteria (i.e., criteria for users allowed, where all other users are disallowed) or a set of blacklist criteria (criteria for users disallowed, where all other users are allowed) for filtering other users. A user can activate or deactivate each of his own filters on demand, so not all filters of the user need be active at a given time. In an exemplary embodiment, only filters that are currently active in the networking system 100 can be used to filter data delivered to the clients 130. Accordingly, the networking system 100 can store a set of filters controlled by the first user, while only applying an active subset of those filters. As a result, a user can conveniently modify his experience with the networking system 100 by simply activating and deactivating filters, instead of having to recreate filters every time a changed experience is desired.

In an exemplary embodiment, all filters controlled or specified by a first user are applicable to the first user. In other words, each filter of a first user either hides the first user or hides other users from the first user. Additionally, other users can specify external and two-way filters applicable to the first user. Together, the active filters controlled by the first user and other active filters applicable to the first user can form a set of filters applicable to the first user, each of which can affect the user's experience on the networking system 100 and each of which can be considered and applied when the networking system 100 provides interfaces 125 to the first user.

In some embodiments, the networking system 100 can create an association between the first user and all active filters applicable to the first user. For example, and not limitation, on the server 110, a user account 450 of the user can be linked to each of the applicable active filters. Accordingly, when the first user's client 130 requests an interface 125, only these filters need be examined to determine how to display the interface 125 to the first user. In some other exemplary embodiments, all active filters can be examined each time an interface 125 is requested. In still some other exemplary embodiments, the complete set of active filters of the networking system 100, including those not applicable to the first user, can be indexed based on filtering criteria. Each time the first user's client 130 requests an interface 125, the index can be used to efficiently identify active filters that apply to the first user.

In an exemplary embodiment of the networking system 100, each user can access the networking system 100 and other users of the networking system 100 by using an associated client 130, which can be connected to the server 110 over the network 50. The user's interactions with the networking system 100 may cause the client 130 to request one or more interfaces 125 of the networking system 100. For example, and not limitation, if the user selects a hyperlink on a web page 128, then the client 130 associated with that user can request the web page 128 referred to by the selected hyperlink. In an exemplary embodiment, such requests for interfaces 125 are made from the client 130 to the server 110.

When an interface 125 is requested, the networking system 100 can transmit to the requesting client 130 data corresponding to the requested interface 125. In an exemplary embodiment, the server 110 can transmit this data to the client 130. If the requested interface 125 is a web page 128, the data transmitted to the client 130 in response to the request can be data corresponding to that web page 128, which can include, for example HTML code, other ark-up language code, scripting code, or a combination thereof. Upon receiving the data, the client 130 can use the data to render the requested interface 125.

The filtering for the requested interface 125 can occur either remotely (e.g., at the server 110), locally (e.g., at the client 130), or a combination of both remotely and locally. In some exemplary embodiments, the filtering is performed remotely, so that the client 130 does not receive data related to hidden users. Alternatively, if the filtering were to occur locally, then the client 130 would have access to data during the filtering process that some user has requested to be hidden from the user associated with the client 130.

As discussed above, each interface 125 can comprise a plurality of displayable objects 350. When a client 130 requests an interface 125, the server 110 can respond by transmitting code for the interface 125 to the client 130. In an exemplary embodiment, the code received can define a layout for the interface 125 and can specify where displayable objects 350 are to be placed within the interface 125. The code can further provide instructions as to which displayable objects 350 are to be rendered in the interface 125 at the client 130, or as to how to retrieve the displayable objects 350 to be rendered in the interface 125 at the client 130. The selection of displayable objects 350 to be rendered can exclude some or all displayable objects 350 representing users hidden from the user associated with the requesting client 130. Accordingly, the networking system 100 can dynamically filter the data of the requested interface 125 to exclude these displayable objects 350.

When an interface 125 is requested, the networking system 100 may examine and compare the requested interface's contents with a set of active filters applicable to the user associated with the requesting client 130. When transmitting the code for an interface 125, the networking system 100, preferably at the server 110, may identify the active filters applicable to the user associated with the requesting client 130. Each displayable object 350 of the requested interface 125 can be compared with this set of applicable active filters to determine whether the user or users represented by the displayable objects 350 are to be hidden from the user at the requesting client 130 by one of these active filters. Each displayable object 350 for which it is determined that the represented user or users are hidden can be filtered from the data transmitted to the client and from interface 125 displayed on the client 130.

If a displayable object 350 is associated with multiple users, where at least one user is hidden by an active filter and at least one user is not hidden by an active filter, then some embodiments of the networking system 100 can exclude that displayable object 350 from display on the requesting client 130. Some other embodiments of the networking system 100, however, can display the displayable object 350 so long as at least one of the represented users is not hidden from the user at client 130. Still other exemplary embodiments can allow each filter to be customized by the user controlling that filter, so that the controlling user can decide how filtering will behave in these instances.

In some embodiments of the networking system 100, some displayable objects 350 can be independent, while some displayable objects 350 can be dependent on one or more other displayable objects 350. Returning to the example presented in FIG. 3, as discussed above, an exemplary interface 125 can include a photo 310 as a first displayable object 350a, a tag 320 as a second displayable object 350b, and a comment 330 as a third displayable object 350c. In this example, tag 320 and the comment 330 were added by users in response to the photo 310, and these two displayable objects 350 would make little sense in the interface 125 without the photo 310 also being included in the interface 125. The photo 310 can thus be deemed an independent displayable object 350, while the tag 320 and the comment 330 can be deemed dependent displayable objects 350 that depend on the photo 310.

A particular displayable object 350 may be dependent on one or more other displayable objects 350, when that particular displayable object 350 is tied to the one or more other displayable objects 350. This may be the case, for example, when the particular displayable object 350 is created or initiated in response to the one or more other displayable objects 350 on which it depends, or relates to or refers to the other displayable objects 350. In the above example, the tag 320 and comment 330 may be deemed dependent on the photo 310, as both the tag 320 and the comment 330 relate to the photo 310 and were initiated in response to the photo 310.

When the networking system 100 provides data for an interface 125 to a client 130, the networking system 100 may exclude and hide from display in the interface 125 not only the displayable objects 350 representing users hidden by applicable active filters, but may also exclude displayable objects 350 that are dependent on one or more other displayable objects 350 that are excluded. For instance, if the photo 310 in the above example is hidden by a filter, then the tag 320 and the comment 330 may be hidden automatically. As a practical matter, if displayed, these dependent displayable objects 350 may not make sense to a user when the displayable objects 350 upon which they depend are hidden. Thus, hiding displayable objects 350 dependent on other hidden displayable objects 350 may prevent potential confusion.

When an interface 125 is requested, the networking system 100 may examine and compare the requested interface's contents with a set of active filters applicable to the user associated with the requesting client 130. When transmitting the code for an interface 125, the networking system 100, preferably at the server 110, may identify the active filters applicable to the user associated with the requesting client 130. Each displayable object 350 of the requested interface 125 may be compared with this set of applicable active filters to determine whether the user or users represented by the displayable objects 350 are hidden from the user at the requesting client 130 by one of these active filters. Each displayable object 350 for which it is determined that the represented user or users are hidden can be filtered from the interface 125 transmitted to and displayed on the client 130.

In an exemplary embodiment of the networking system 100 that utilizes a website 120, one or more web pages 128 of the website 120 can utilize JavaScript or some other mechanism configured to enable those web pages 128 to be provided dynamically based on a current state of the web page 128. A dynamic web page 128 according to the present invention can have a static layout to be dynamically filled with displayable objects 350 corresponding to the web page 128.

In the networking system 100, server-side scripting can be utilized to render or dynamically update a web page 128 without displayable objects 350 excluded by active filters. Server-side scripting can be implemented using one or more of, for example, PHP, Perl, ASP, ASP.NET, JSP, ColdFusion, or another scripting language. In server-side scripting, the client 130 encounters a script while rendering the web page 128. Based on the content of the script, the client 130 can send the server 110 a request or query string. In response to the request, the server 110 can return content to be included in the rendered web page 128. The content returned by the server 110 can vary based on the present state of the networking system 100, including currently active filters.

As discussed above, a web page 128 of the networking system 100 can comprise a plurality of displayable objects 350. The code for a web page 128 can instruct the client 130 to render displayable objects 350 within a region, such as a frame or other portion, of the web page 128. The size and shape of the region can be provided, for example, in static HTML, through the use of client-side scripting, or a combination of static HTML and client-side scripting. The displayable objects 350 making up the content of the region can be rendered through the use of server-side scripting. The web page code can instruct the client 130 to, iteratively, call the server 110 to request another displayable object 350 to display within the current region of the web page 128, until the server 110 returns an indication that no further displayable objects 350 are available. Each request to the server 110 can include one or more of an identifier of the web page 128, an identifier of the client 130, an identifier of the current section of the web page 128 in which the requested displayable object 350 is to be placed, and an identifier of the previous displayable object 350 provided. With the information provided in the request, along with information about active filters of the networking system 100, the server 110 can thus identify the next displayable object 350 to deliver to the client 130. While rendering the web page 128, the client 130 can repeatedly ask the server 110 for another displayable object 350, until the indication is received that no further displayable objects 350 are to be rendered.

On the server side, the server 110 can have access to the complete list of objects to be displayed on the web page 128, and the server 110 can also have access to a set of active filters. Each time the client 130 requests a new displayable object 350, the server 110 can thus identify the next displayable object and then determine whether that object should be filtered out according to any one of the relevant active filters. If the server 110 determines that the displayable object 350 should be filtered, then the server 110 can skip that displayable object 350 and examine the next object. If the server 110 reaches a displayable object 350 that should not be filtered, then that displayable object 350 can be returned to the client 130 for display. If the server 110 instead reaches the end of the list, such that no further objects are available to return to the client 130, the server 110 can instead send to the client 130 an indication that no further objects are available.

Alternatively, the filtering may also be performed on the client-side. For example, the server 110 can forward to the client 130 the list of all displayable objects 350 that might be displayed in the current region regardless of active filters, and the server 110 can also forward to the client 130 the set of the active filters. Instructed by client-side scripting on the web page 128, the client 130 can apply the filters locally, so as to display only those displayable objects 350 that are not filtered out by the set of active filters. Although potentially more efficient than the server-side approach, this client-side approach has the negative effect of storing all of the displayable objects 350 on the client 130. As a result, even though not all displayable objects 350 are displayed on the web page 128, because of the applied filters, the user at the client 130 may be able to access the displayable objects 350 that are not displayed. In some embodiments, it may be preferred not to send filtered-out displayable objects 350 to the client 130. For example, if another user has a filter indicating that the other user wishes to hide from the current user, then sending a displayable object 350 associated with that other user to the current user's client 130 may be undesirable to the other user. Further, that other user may also desire not have the existence of his filter stored on the current user's client 130.

Figure 5:
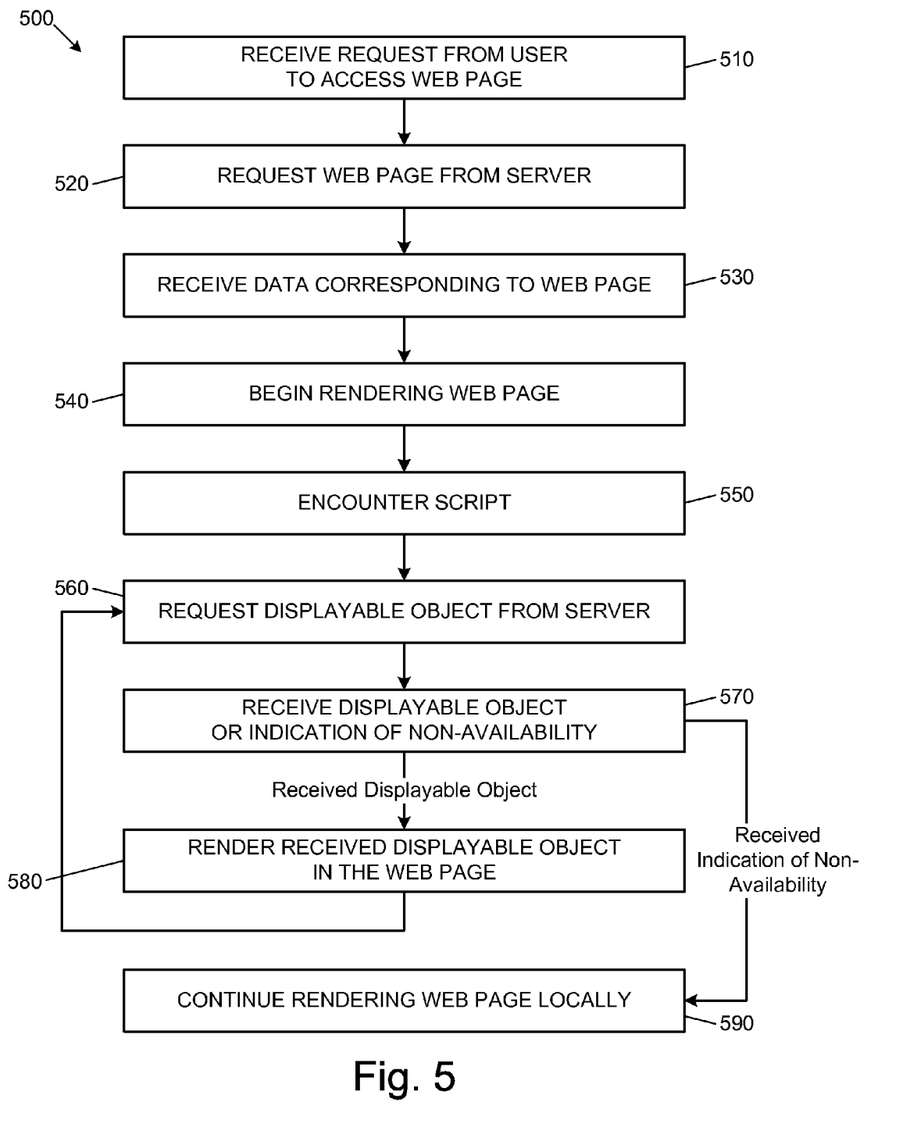
FIG. 5 illustrates a first method of applying filters to a web page of the networking system, according to an exemplary embodiment of the present invention.

FIG. 5 illustrates a method 500 of applying a newly received filter to a web page 128 of the networking system 100, from the perspective of a client 130, according to an exemplary embodiment of the present invention. It will be understood that this method 500 is provided for illustrative purposes only, and that alternative methods can be used by the networking system 100. As shown, at 510, an indication is received from the user that the user desires to access a particular web page 128. At 520, a request for the web page 128 is transmitted to the server 110. At 530, data corresponding to the web page 128 is received from the server 110. In an exemplary embodiment, the received data can comprise static web page code as well as server-side scripting code for rendering the web page 128. At 540, rendering of the web page 128 begins. At 550, while rendering the web page 128, a script is encountered that requires the client 130 to request displayable objects 350 from the server 110 repeatedly until the server 110 indicates that no further displayable objects 350 are available. At 560, a displayable object 350 is requested from the server 110. At 570, the client 130 either receives a displayable object 350 or an indication that no further displayable objects 350 are available. At 580, if a displayable object 350 was received then that displayable object 350 is rendered as part of the web page 128, and then another displayable object 350 is requested at 560. If instead, an indication is received that no further displayable objects 350 are available, then at 590, the client 130 ceases requesting displayable objects 350 and continues to render the web page 128 locally. According to this method 500, the client 130 may render the web page 128 with only the displayable objects 350 that the server 110 provides, where the server 110 filters the displayable objects 350 before they are delivered to the client 130.

Figure 6:
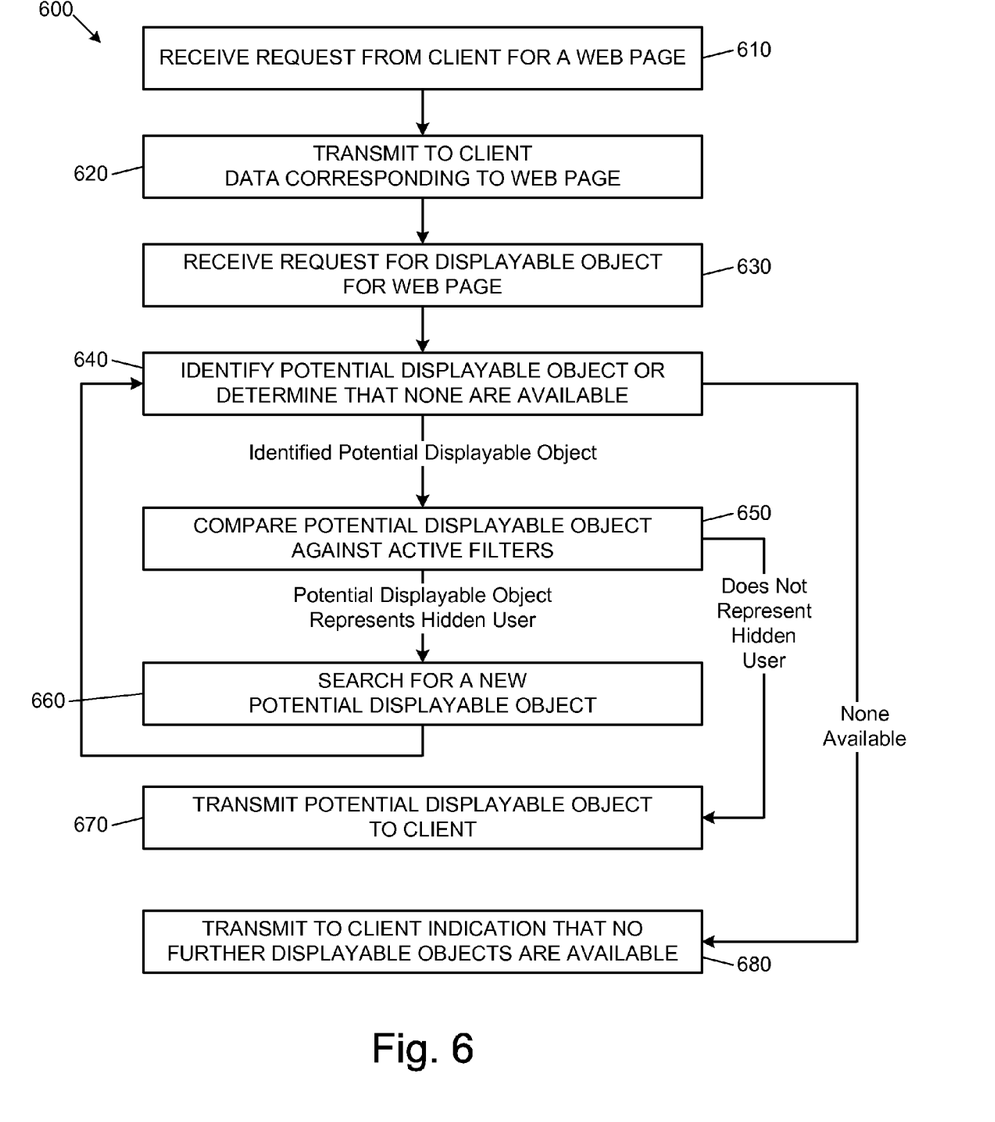
FIG. 6 illustrates a second method of applying filters to a web page of the networking system, according to an exemplary embodiment of the present invention.

FIG. 6 illustrates a method 600 of applying a newly received filter to a web page 128 of the networking system 100, from the perspective of the server 110, according to an exemplary embodiment of the present invention. It will be understood that this method 600 is provided for illustrative purposes only, and that alternative methods can be used by the networking system 100. As shown, at 610, a request is received from a client 130 for a particular web page 128. At 620, data corresponding to the requested web page 128 is transmitted to the client 130. In an exemplary embodiment, the transmitted data can comprise static web page code as well as server-side scripting code for rendering the web page 128. At 630, a request is received from the client 130 for displayable object 350 to include in the web page 128. In an exemplary embodiment, the request provides sufficient data for the server 110 to identify a potential displayable object 350 that would be provided next to the client 130 if no active filters were applicable. At 640, a potential displayable object 350 is identified, or it is determined that no further displayable objects 350 are available that meet the request criteria. If it is determined that no further displayable objects 350 are available, then at 680, an indication of the lack of available displayable objects 350 is transmitted to the client 130. Alternatively, if a potential displayable object 350 was identified, then at 650, the potential displayable object 350 is compared against the active filters of the networking system 100 to determine whether the potential displayable object 350 represents a user that is hidden from the user associated with the client 130. At 660, if the potential displayable object 350 represents a hidden user, then the method 600 returns to 640 to identify a next potential displayable object 350. If the potential displayable object 350 does not represent a hidden user, then at 670, the potential displayable object 350 is transmitted to the client 130 in response to the request. Accordingly, the server 110 can filter displayable objects 350 according to active filters, thus enabling the client 130 to render filtered web pages 128.

Through the networking system 100 and its robust filtering capabilities, users can customize a networking environment so as to see and interact with only other users that meet defined criteria. As a result, a user can avoid potential distractions of other users with whom that user has no desire to network.

While the networking system 100 has been disclosed in exemplary forms, it will be apparent to those skilled in the art that many modifications, additions, and deletions can be made without departing from the spirit and scope of the system, method, and their equivalents, as set forth in the following claims.

The invention claimed is:

1. A method for interacting with a virtual environment electronically accessible by a plurality users, and having a plurality of interfaces and a plurality of displayable objects, each interface comprising a corresponding set of the displayable objects, each displayable object associated with a content provider or user of the virtual environment, the method comprising:

sending, by a first content provider, to a host of the virtual environment, a first request to apply a first filter to the virtual environment, the first request comprising an indication of a filtering criterion, and the first filter for filtering displayable objects corresponding to the first content provider from viewing by a first user that meets the filtering criterion indicated by the first request from the content provider;

wherein, responsive to receiving the first request from the first content provider, the host of the virtual environment determines a filtered subset of the plurality of displayable objects based on the first request, the filtered subset including (1) the displayable objects corresponding to the first content provider and (2) additional displayable objects dependent on one or more of the displayable objects corresponding to the first content provider; and wherein responsive to receiving a second request, from the first user, to view a set of displayable objects from the virtual networking environment, the host of the virtual environment provides, to the first user, the plurality of interfaces while hiding the filtered subset of the plurality of displayable objects in the plurality of interfaces.

2. The method of claim 1, wherein the filtering criterion corresponds to a user age requirement.

3. The method of claim 1, wherein, further responsive to receiving the first request from the first content provider, the host of the virtual networking environment hides displayable objects corresponding to the first user from viewing by the content provider.

4. The method of claim 1, wherein, responsive to a new interface being introduced to the virtual environment, the host of the virtual environment dynamically updates the filtered subset of the plurality of displayable objects.

5. The method of claim 1, further comprising:
sending, by the first content provider, to the host of the virtual environment, a third request to deactivate the first filter;
wherein, responsive to the third request, the host of the virtual environment automatically updates the plurality of interfaces viewable by the first user to include the filtered subset of the plurality of displayable objects.

6. The method of claim 1, the plurality of interfaces comprising web pages, the virtual environment being accessible by the first user via web client.

7. A system comprising:
a virtual environment electronically accessible by a plurality users, and having a plurality of interfaces and a plurality of displayable objects, each interface comprising a corresponding set of the displayable objects, each displayable object associated with a content provider or user of the virtual environment, the method comprising:
a processor; and
a memory operatively coupled to the processor and configured for storing data and instructions that, when executed by the processor, cause the system to perform a method, comprising:
sending, by a first content provider, to a host of the virtual environment, a first request to apply a first filter to the virtual environment, the first request comprising an indication of a filtering criterion, and the first filter for filtering displayable objects corresponding to the first content provider from viewing by a first user that meets the filtering criterion indicated by the first request from the content provider;
wherein, responsive to receiving the first request from the first content provider, the host of the virtual environment determines a filtered subset of the plurality of displayable objects based on the first request, the filtered subset including (1) the displayable objects corresponding to the first content provider and (2) additional displayable objects dependent on one or more of the displayable objects corresponding to the first content provider; and
wherein responsive to receiving a second request, from the first user, to view a set of displayable objects from the virtual networking environment, the host of the virtual environment provides, to the first user, the plurality of interfaces while hiding the filtered subset of the plurality of displayable objects in the plurality of interfaces.

8. The system of claim 7, wherein the filtering criterion corresponds to a user age requirement.

9. The system of claim 7, wherein, further responsive to receiving the first request from the first content provider, the host of the virtual networking environment hides displayable objects corresponding to the first user from viewing by the content provider.

10. The system of claim 7, wherein, responsive to a new interface being introduced to the virtual environment, the host of the virtual environment dynamically updates the filtered subset of the plurality of displayable objects.

11. The system of claim 7, the method further comprising:
sending, by the first content provider, to the host of the virtual environment, a third request to deactivate the first filter;
wherein, responsive to the third request, the host of the virtual environment automatically updates the plurality of interfaces viewable by the first user to include the filtered subset of the plurality of displayable objects.

12. The system of claim 7, the plurality of interfaces comprising web pages, the virtual environment being accessible by the first user via web client.

13. A computer program product embodied in a non-transitory computer-readable medium, the computer program product comprising an algorithm adapted to effectuate a method comprising:
providing a virtual environment electronically accessible by a plurality users, and having a plurality of interfaces and a plurality of displayable objects, each interface comprising a corresponding set of the displayable objects, each displayable object associated with a content provider or user of the virtual environment, the method comprising:
sending, by a first content provider, to a host of the virtual environment, a first request to apply a first filter to the virtual environment, the first request comprising an indication of a filtering criterion, and the first filter for filtering displayable objects corresponding to the first content provider from viewing by a first user that meets the filtering criterion indicated by the first request from the content provider;
wherein, responsive to receiving the first request from the first content provider, the host of the virtual environment determines a filtered subset of the plurality of displayable objects based on the first request, the filtered subset including (1) the displayable objects corresponding to the first content provider and (2) additional displayable objects dependent on one or more of the displayable objects corresponding to the first content provider; and
wherein responsive to receiving a second request, from the first user, to view a set of displayable objects from the virtual networking environment, the host of the virtual environment provides, to the first user, the plurality of interfaces while hiding the filtered subset of the plurality of displayable objects in the plurality of interfaces.

14. The computer program product of claim 13, wherein the filtering criterion corresponds to a user age requirement.

15. The computer program product of claim 13, wherein, further responsive to receiving the first request from the first content provider, the host of the virtual networking environment hides displayable objects corresponding to the first user from viewing by the content provider.

16. The computer program product of claim 13, wherein, responsive to a new interface being introduced to the virtual environment, the host of the virtual environment dynamically updates the filtered subset of the plurality of displayable objects.

17. The computer program product of claim 13, the method further comprising:
- sending, by the first content provider, to the host of the virtual environment, a third request to deactivate the first filter;
- wherein, responsive to the third request, the host of the virtual environment automatically updates the plurality of interfaces viewable by the first user to include the filtered subset of the plurality of displayable objects.

18. The computer program product of claim 13, the plurality of interfaces comprising web pages, the virtual environment being accessible by the first user via web client.

* * * * *